US012128886B2

(12) United States Patent
Park

(10) Patent No.: US 12,128,886 B2
(45) Date of Patent: Oct. 29, 2024

(54) OBSTACLE DETECTION SYSTEM AND METHOD FOR VEHICLE

(71) Applicant: HYUNDAI MOBIS Co., Ltd., Seoul (KR)

(72) Inventor: Ge O Park, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 213 days.

(21) Appl. No.: 17/883,152

(22) Filed: Aug. 8, 2022

(65) Prior Publication Data

US 2023/0045745 A1 Feb. 9, 2023

(30) Foreign Application Priority Data

Aug. 9, 2021 (KR) .................. 10-2021-0104824

(51) Int. Cl.
*B60W 30/095* (2012.01)
*B60W 40/06* (2012.01)
*B60W 50/14* (2020.01)
*B60W 60/00* (2020.01)

(52) U.S. Cl.
CPC ........ *B60W 30/0953* (2013.01); *B60W 40/06* (2013.01); *B60W 50/14* (2013.01); *B60W 60/00186* (2020.02); *B60W 2510/20* (2013.01)

(58) Field of Classification Search
CPC .. B60W 30/0953; B60W 40/06; B60W 50/14; B60W 60/00186; B60W 2510/20; B60W 2556/50; B60W 30/18036; B60W 40/02; B60W 40/10; B60W 10/20; B60R 21/0134
See application file for complete search history.

(56) References Cited

U.S. PATENT DOCUMENTS

| 5,530,421 | A | * | 6/1996 | Marshall | B60R 1/26 340/436 |
| 5,670,962 | A | * | 9/1997 | Henderson | G01S 13/931 342/84 |
| 8,467,956 | B2 | * | 6/2013 | Lee | G08G 1/096791 701/500 |
| 8,798,841 | B1 | * | 8/2014 | Nickolaou | B62D 15/0265 701/28 |
| 2005/0134448 | A1 | * | 6/2005 | Perlman | B60Q 1/26 340/426.18 |

(Continued)

FOREIGN PATENT DOCUMENTS

KR 10-2021-0060237 A 5/2021

*Primary Examiner* — Kurt Philip Liethen

(74) *Attorney, Agent, or Firm* — MORGAN, LEWIS & BOCKIUS LLP

(57) ABSTRACT

The present invention discloses a system for detecting an obstacle for a vehicle. The system includes an information collection unit that monitors movement information of a vehicle, road information, and location information of the vehicle; a determination unit that determines whether the vehicle enters a special mode in which the vehicle turns and moves backward on a road through the movement information of the vehicle, the road information, and the location information of the vehicle from the information collection unit; and a controller that deactivates a rear monitoring function of either side of the vehicle in response to a determination that the vehicle enters the special mode.

17 Claims, 4 Drawing Sheets

(56) References Cited

U.S. PATENT DOCUMENTS

| | | | |
|---|---|---|---|
| 2007/0041614 A1* | 2/2007 | Tanji | G06V 20/588 |
| | | | 382/104 |
| 2008/0162027 A1* | 7/2008 | Murphy | G05D 1/0246 |
| | | | 701/1 |
| 2016/0046230 A1* | 2/2016 | Choi | B60R 9/06 |
| | | | 340/435 |
| 2016/0304097 A1* | 10/2016 | Taira | B60W 10/20 |
| 2018/0365858 A1* | 12/2018 | Kim | G06T 7/13 |
| 2019/0250597 A1* | 8/2019 | Takama | G05B 19/042 |
| 2020/0240806 A1* | 7/2020 | Daikoku | G01C 21/38 |

* cited by examiner

OBSTACLE DETECTION SYSTEM AND METHOD FOR VEHICLE

CROSS REFERENCE TO RELATED APPLICATION

The present application claims priority to Korean Patent Application No. 10-2021-0104824, filed Aug. 9, 2021, the entire contents of which is incorporated herein for all purposes by this reference.

BACKGROUND OF THE DISCLOSURE

Field of the Disclosure

The present disclosure relates to a system and method for detecting an obstacle for a vehicle, and relates to a rear cross collision warning technology when a vehicle moves backward.

Description of the Related Art

Along with the advanced technology development related to autonomous driving of vehicles, various vehicle safety technologies are being developed in consideration of the convenience and safety of vehicle drivers, and many are being applied to actual vehicles.

Specifically, technologies for detecting the possibility of collision between an own vehicle and another vehicle or an obstacle, and warning the driver or controlling the vehicle accordingly have been developed. Among them, a rear cross collision warning (RCCW) function is a function to warn the driver so that the driver recognizes obstacles approaching from the side when the vehicle is stopped or moves backward.

However, the vehicle turns and moves backward when the vehicle turns into backward moving and enters a road, or when the width of the road is insufficient at a U-turn. At this time, a detection sensor generates a warning signal from the rear of the vehicle toward both the movement direction on the road and the vehicle in the opposite movement direction but there is a problem that the warning toward the vehicle in the opposite movement direction is unnecessary.

The matters described as the background art above are only for improving the understanding of the background of the present disclosure, and should not be taken as acknowledging that they correspond to the prior art already known to those of ordinary skill in the art.

SUMMARY

The present disclosure has been proposed to solve this problem, and the object of the present disclosure is to determine a situation in which a vehicle turns and moves backward after making a U-tern or enters a road by turning and moving backward, and to deactivate the detection of an obstacle moving in the opposite direction to the entered road.

A system for detecting an obstacle for a vehicle according to the present disclosure includes an information collection unit configured to monitor movement information of a vehicle, road information, and location information of the vehicle; a determination unit configured to determine whether the vehicle enters a special mode in which the vehicle turns and moves backward on a road through the movement information of the vehicle, the road information, and the location information of the vehicle of the information collection unit; and a control unit configured to deactivate a rear monitoring function of either side in a state in which the special mode is entered when the rear monitoring function in both a driving direction and an opposite driving direction is activated to generate a warning signal to a driver.

The information collection unit may be connected to a navigator and a GPS provided in the vehicle to monitor the movement information, the road information, and the location information of the vehicle.

The information collection unit may check information on a lane in which the vehicle moves through the connected navigator, and monitor a U-turn situation of the vehicle through the GPS, and the determination unit may determine whether to enter the special mode during the U-turn of the vehicle.

If the determination unit determines that the vehicle enters the special mode during the U-turn, the control unit may deactivate the rear monitoring function on a side of a direction of the U-turn checked through the information collection unit connected to the GPS.

The information collection unit is connected to a steering wheel of the vehicle, and if the determination unit determines that the vehicle enters the special mode during the U-turn, the control unit may deactivate the rear monitoring function on a side opposite to a turn direction of a backward movement checked through the information collecting unit connected to the steering wheel.

The information collection unit may check the information on a lane in which the vehicle moves through the connected navigator, and monitor the vehicle's entry into a road through the GPS, and the determination unit may determine whether to enter the special mode when the vehicle enters the road.

If the determination unit determines that the special mode is entered when the vehicle enters the road, the control unit may deactivate the rear monitoring function on a side opposite to a vehicle's entry direction checked through the information collection unit connected to the GPS.

The information collection unit is connected to a steering wheel of the vehicle, and if the determination unit determines that the special mode is entered when the vehicle enters the road, the control unit may deactivate the rear monitoring function on a side opposite to a turn direction of the vehicle checked through the information collection unit connected to the steering wheel.

The system may further include a sensing unit that is provided at a rear of the vehicle to sense an obstacle moving in a direction intersecting a backward movement direction of the vehicle from the rear of the vehicle and performs the rear monitoring function. The sensing unit may be operated when the vehicle moves backward.

A method for detecting an obstacle for a vehicle according to the present disclosure includes the steps of monitoring movement information of a vehicle, road information, and location information of the vehicle; determining whether the vehicle enters a special mode in which the vehicle turns and moves backward on a road through the movement information of the vehicle, the road information, and the location information of the vehicle of an information collection unit; and controlling a rear monitoring function of either side to be deactivated in a state in which the special mode is entered.

The monitoring movement information may include the steps of obtaining the road information through a navigator provided in the vehicle and monitoring the movement information and the location information of the vehicle in connection with a GPS.

In the obtaining the road information, information on a lane in which the vehicle moves may be checked through the connected navigator, in the step of monitoring the location information, a U-turn situation of the vehicle may be monitored through the GPS, and in the determining, whether the vehicle enters a special mode during the U-turn may be determined.

In the determining, if it is determined that the vehicle enters the special mode during the U-turn, the rear monitoring function on a side of a direction of the U-turn checked in the monitoring the location information may be deactivated in the controlling.

The monitoring may further include step of monitoring a turn direction of the vehicle through a turn direction of a steering wheel of the vehicle. In the determining, if it is determined that the vehicle enters the special mode during the U-turn, the rear monitoring function on a side opposite to the turn direction of a backward movement checked through the step of monitoring the turn direction of the vehicle may be deactivated in the controlling.

In the obtaining the information, information on a lane in which the vehicle moves may be checked through the connected navigator, in the step of monitoring the location information, a situation in which the vehicle enters a load may be monitored through the GPS, and in the determining, whether to enter the special mode when the vehicle enters the road may be determined.

If it is determined in the determining that the special mode is entered when the vehicle enters the road, the rear monitoring function on a side opposite to a vehicle's entry direction checked in the step of monitoring the location information may be deactivated in the controlling.

The monitoring step may further include monitoring a turn direction of the vehicle through a turn direction of a steering wheel of the vehicle, and if it is determined in the determining that the special mode is entered when the vehicle enters the road, the rear monitoring function on a side opposite to the turn direction of the vehicle checked through the step of monitoring the turn direction may be deactivated in the controlling.

The system for detecting an obstacle for a vehicle according to the present disclosure determines a situation in which the vehicle turns and moves backward after making a U-tern or enters a road by turning and moving backward, and deactivates the rear monitoring function on the side opposite to the direction of turn and backward movement to deactivate the detection of the obstacle moving in the opposite direction to the entered road, so that a warning signal for the obstacle that does not need to be detected is not generated. Accordingly, there is an effect of reducing the confusion experienced by the driver when turning and moving backward on the road.

DETAILED DESCRIPTION

Figure 1:
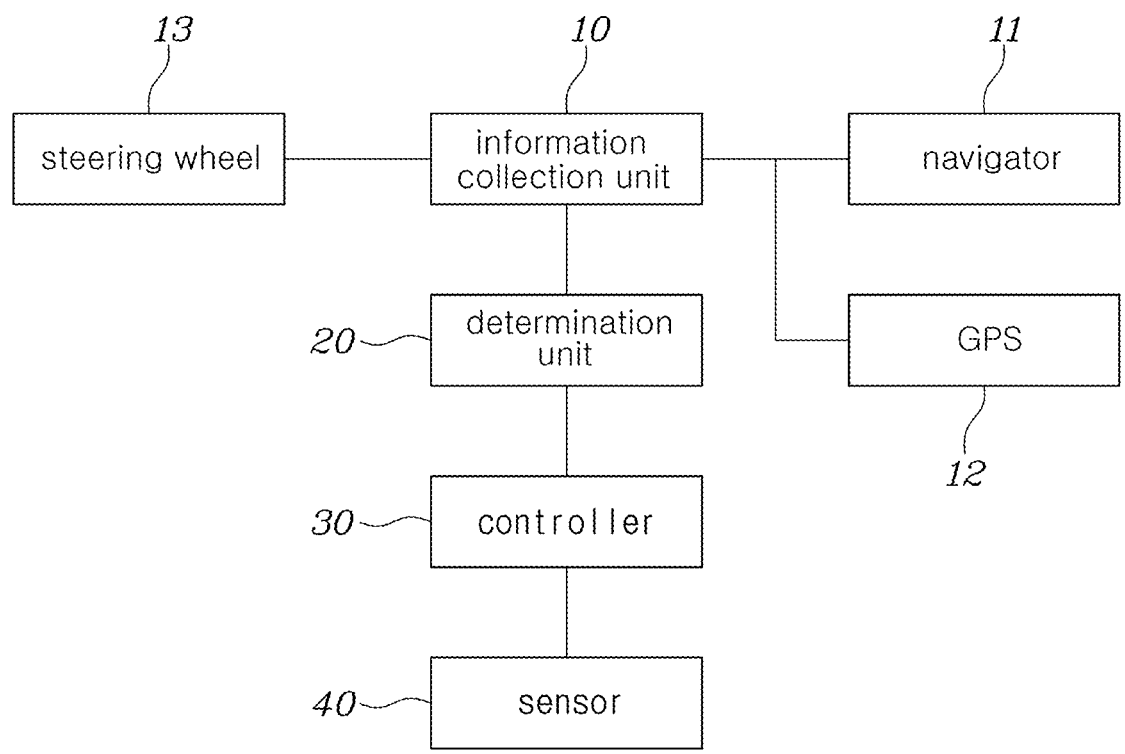
FIG. 1 is a block diagram of a system for detecting an obstacle for a vehicle according to an embodiment of the present disclosure.

Specific structural or functional descriptions of the embodiments of the present disclosure disclosed in the present specification or application are merely illustrative for the purpose of describing the embodiments according to the present disclosure, and the embodiments according to the present disclosure are implemented in various forms and should not be construed as being limited to the embodiments described in the present specification or application.

Since the embodiment according to the present disclosure can have various changes and can have various forms, specific embodiments are illustrated in the drawings and described in detail in the present specification or application. However, this is not intended to limit the embodiment according to the concept of the present disclosure with respect to a specific disclosed form and should be understood to include all changes, equivalents or substitutes included in the spirit and scope of the present disclosure.

Terms such as first and/or second may be used to describe various components, but the components should not be limited by the terms. The above terms are used only for the purpose of distinguishing one component from another, for example, without departing from the scope of the present disclosure, a first component may be referred to as a second component, and similarly the second component may also be referred to as the first component.

When a component is referred to as being "connected" or "contacted" to another component, it may be directly connected or contacted to the other component, but it should be understood that another component may exist in the middle. On the other hand, when it is mentioned that a certain component is "directly connected" or "directly contacted" to another component, it should be understood that no other element is present in the middle. Other expressions describing the relationship between components, such as "between" and "immediately between" or "neighboring to" and "directly adjacent to", etc., should be interpreted similarly.

The terms used herein are used only to describe specific embodiments, and are not intended to limit the present disclosure. The singular expression includes the plural expression unless the context clearly dictates otherwise. In this specification, terms such as "comprise" or "have" are intended to designate the existence of an embodied feature, number, step, operation, component, part, or a combination thereof, and it should be understood that it does not preclude the existence or addition of one or more other features or numbers, steps, operations, components, parts, or combinations thereof.

Unless defined otherwise, all terms used herein, including technical and scientific terms, have the same meaning as commonly understood by one of ordinary skill in the art to which this disclosure belongs. Terms such as those defined in commonly used dictionaries should be interpreted as having meanings consistent with the context of the related art, and unless explicitly defined in the present specification, they are not to be interpreted in an ideal or excessively formal meaning.

Hereinafter, the present disclosure will be described in detail by describing preferred embodiments of the present disclosure with reference to the accompanying drawings. Like reference numerals in each figure indicate like elements.

A control unit 30 according to an exemplary embodiment of the present disclosure includes a non-volatile memory (not shown) configured to store data regarding an algorithm configured to control the operations of various components of a vehicle or a software command for reproducing the algorithm, and a processor (not shown) configured to perform operations described below using the data stored in the corresponding memory. Here, the memory and the processor may be implemented as separate chips. Alternatively, the memory and processor may be implemented as a single chip integrated with each other. A processor may take the form of one or more processors.

Figure 2:
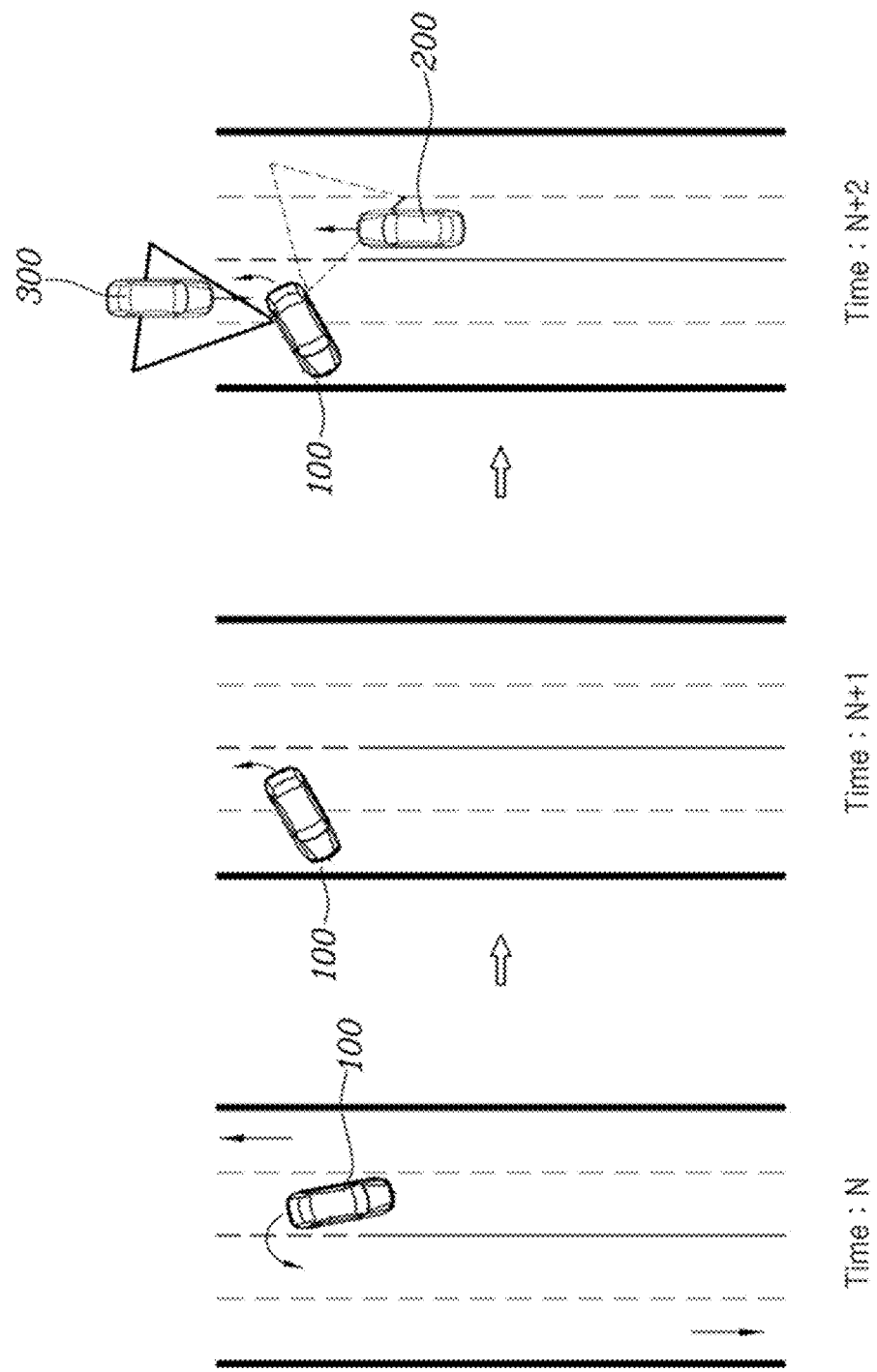
FIG. 2 is a view showing a U-turn situation of a vehicle in an embodiment of the present disclosure.
Figure 3:
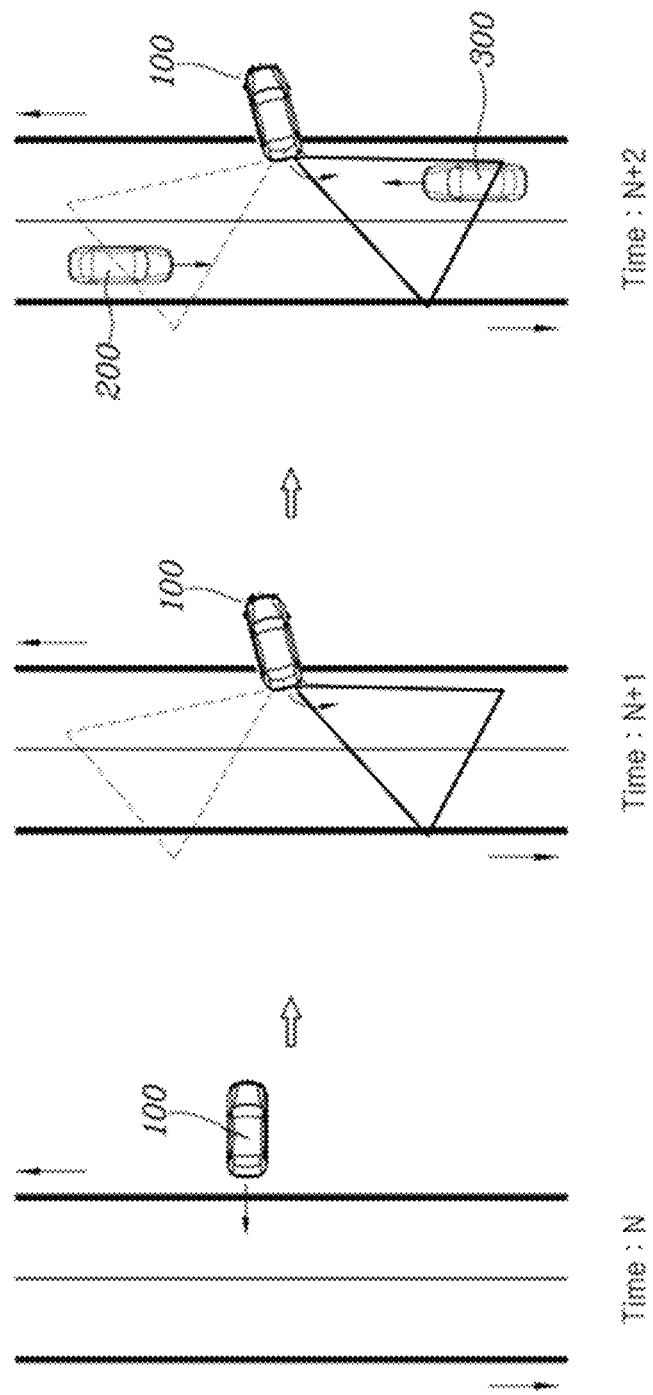
FIG. 3 is a view showing a situation in which a vehicle enters a road in an embodiment of the present disclosure.

FIG. 1 is a block diagram of a system for detecting an obstacle for a vehicle according to an embodiment of the present disclosure, FIG. 2 is a view showing a U-turn situation of a vehicle in an embodiment of the present disclosure, FIG. 3 is a view showing a situation in which a vehicle enters a road in an embodiment of the present disclosure.

A dotted line in the detection range of FIGS. 2 to 3 indicates that a warning signal is deactivated, and a solid line indicates that the warning range is activated.

A preferred embodiment of a system for detecting an obstacle for a vehicle according to the present disclosure will be described with reference to FIGS. 1 to 3.

In a conventional vehicle, a detection sensor is provided at the rear of the vehicle to detect an obstacle moving in a direction intersecting with the vehicle when the vehicle moves backward. The detection sensor with a rear detection function is operated when the driver shifts a gear to reverse, so that the obstacle moving from the rear right and left can be detected.

However, the vehicle turns and moves backward when the vehicle enters the road by turning in moving backward, or when the width of the road is insufficient at the U-turn. In this case, the detection sensor generates a warning signal from the rear of the vehicle toward both the movement direction on the road and the vehicle in the opposite movement direction but the warning toward the vehicle in the opposite movement direction is unnecessary.

In the system for detecting an obstacle for a vehicle of the present disclosure, a situation in which the vehicle turns and moves backward on the road as described above is defined as a special mode. The purpose is to prevent the driver from experiencing confusion by terminating a warning signal in the special mode for a vehicle moving in the opposite direction to the road on which the vehicle is located.

A system for detecting an obstacle for a vehicle according to the present disclosure includes an information collection unit 10 that monitors movement information of the vehicle, road information, and location information of the vehicle; a determination unit 20 that determines whether the vehicle enters a special mode in which the vehicle turns and moves backward on the road through the movement information of the vehicle, the road information, and the location information of the vehicle of the information collection unit 10; and a control unit 30 that deactivates a rear monitoring function of either side in a state in which the special mode is entered when the rear monitoring function in both a driving direction and an opposite driving direction is activated to generate a warning signal to a driver.

The information collection unit 10 may be connected to the driving device of the vehicle to check a forward movement or backward movement of the vehicle, and may also check a turning movement or straight movement of the vehicle.

The driving device of the vehicle may be an engine, a transmission, or a steering device, and the information collection unit 10 may be connected to an operating device such as a gear lever, an accelerator pedal, or a steering wheel 13 through which the driver operates the driving device.

In addition, the information collection unit 10 may be connected to a navigator 11 or a GPS 12 of the vehicle to collect information on a current location and movement direction of the vehicle to obtain road information and location information.

The determination unit 20 may determine a situation in which the vehicle enters a special mode in which the vehicle turns and moves backward on the road based on the movement information and location information of the vehicle and the road information on which the vehicle currently moves collected by the information collection unit 10.

After that, when the determination unit 20 determines that the special mode has been entered, the control unit 30 controls to terminate the monitoring function for an obstacle on the road moving in the opposite direction to the road on which the vehicle is located among the rear monitoring functions of both sides.

Through this, the control unit 30 controls the rear monitoring function to warn only the obstacle to which the driver should be alert, thereby preventing the driver from experiencing confusion.

As described above, the information collection unit 10 may be connected to the navigator 11 and the GPS 12 provided in the vehicle to monitor the movement information, the road information, and the location information of the vehicle.

The information collection unit 10 is connected to the navigator 11 to collect the movement direction on the road on which the vehicle moves or the movement path of the vehicle to predict the movement direction of the vehicle, and is connected to the GPS 12 to check the current location of the vehicle and the movement direction and the movement speed.

The determination unit 20 may check the entry into the special mode of the vehicle based on this.

Hereinafter, as a first embodiment of the present disclosure, the information collection unit 10 checks information on the lane in which the vehicle moves through the connected navigator 11, and monitors the U-turn situation of the vehicle through the GPS 12, The determination unit 20 may determine whether to enter the special mode during the U-turn of the vehicle.

FIG. 2 shows a situation in which after a U-turn, the road width is narrow compared to the length of the vehicle, and the vehicle turns and moves backward to align itself with the lane.

The U-turn situation is checked in the expected path of the vehicle 100 collected by the information collection unit 10 or the current U-turn situation of the vehicle is checked through the GPS 12. The information on the vehicle turning and moving backward after the turning for the U-turn is checked through the GPS 12. The determination unit 20 can determine whether the vehicle enters the special mode through this information.

As the first embodiment for determining the turn and backward movement of the vehicle, when the determination unit 20 determines that the vehicle enters the special mode during the U-turn, the control unit 30 can deactivate the rear monitoring function on the side of the U-turn direction checked through the information collection unit 10 connected to GPS 12.

The information collection unit 10 monitors the information of the navigator 11 and the information of the GPS 12 to collect the movement information in which the vehicle turns and moves backward after the U-turn, and the determination unit 20 determines whether the vehicle enters the special mode based on this.

In this case, the control unit 30 may monitor the U-turn direction of the vehicle 100 collected by the information collection unit 10 as the information of the GPS 12, and detect only the obstacle 300 moving in the movement direction of the lane in which the vehicle is currently moving by terminating the rear detection function of the monitored U-turn direction. Thus, there is an effect of preventing the driver from experiencing confusion by detecting only the obstacle 300 moving in the movement direction on the lane and not detecting the obstacle 200 moving in the opposite direction to the movement direction on the lane.

As a second embodiment of determining the turn and backward movement direction of the vehicle, the information collection unit 10 is connected to the steering wheel 13 of the vehicle, and when the determination unit 20 determines that the vehicle enters the special mode during the U-turn, the control unit 30 may deactivate the rear monitoring function on the side opposite to the turn direction of the backward movement checked through the information collecting unit 10 connected to the steering wheel 13.

The information collection unit 10 collects the movement information in which the vehicle turns and moves backward after the U-turn, and the determination unit 20 may determine whether the vehicle enters the special mode based on this information.

The information collection unit 10 monitors the information of the navigator 11 and the information of the GPS 12 to collect the information on making a U-turn, and collets the movement information in which the vehicle turns and moves backward after the U-turn through the turn information of the steering wheel 13. The determination unit 20 may determine whether the vehicle enters the special mode based on this this information.

In this case, the control unit 30 may monitor the U-turn direction of the vehicle collected by the information collection unit 10 as the information of the GPS 12, and may detect only the obstacle moving in the movement direction on the lane in which the vehicle is currently moving by terminating the rear detection function on the side in which the vehicle turns and moves backward while the steering turns in the opposite direction to the U-turn direction to move backward after making the U-tern. Therefore, it has the effect of preventing the driver from experiencing confusion by controlling so as not to detect the obstacle moving in the direction opposite to the movement direction on the lane.

When the turn and backward movement direction of the vehicle is checked through the turning of the steering wheel 13, there is an effect of more intuitively checking the turn direction.

Next, as the second embodiment of the present disclosure, the information collection unit 10 checks the information on the lane in which the vehicle moves through the connected navigator 11, and monitors the vehicle's road entry situation through the GPS 12, and the determination unit 20 may determine whether the vehicle enters the special mode when the vehicle enters the road.

FIG. 3 shows a situation in which a vehicle 100 enters a road in which a lane and a center line are arranged from a road without the lane such as an alleyway, and the vehicle 100 turns and moves backward to enter the road.

The road entry of the vehicle in the expected path of the vehicle collected by the information collection unit 10 is checked or the situation in which the vehicle is currently entering the road is checked through the GPS 12, and the information that the vehicle enters the road while turning and moving backward is checked through the information of the GPS 12. Through this information, the determination unit 20 can determine whether the vehicle enters the special mode.

As the first embodiment for determining the turn and backward movement direction of the vehicle, when the determination unit 20 determines that the vehicle enters the special mode in entering the road, the control unit 30 may deactivate the rear monitoring function on the side opposite to the direction in which the vehicle is entering, which is checked through the information collection unit 10 connected to the GPS 12.

The information collection unit 10 monitors the information of the navigator 11 and the information of the GPS 12 to collect the movement information that the vehicle enters the road by turning and moving backward, and the determination unit 20 may determine whether the vehicle enters the special mode based on this information.

In this case, after the determination unit 20 determines that the vehicle enters the special mode, the control unit 30 may control to deactivate the rear detection function on the side opposite to the turn and backward movement direction based on the vehicle's turn and backward movement direction through the information of the navigator 11 and the information of the GPS 12 collected by the information collection unit 10.

Through this, only the obstacle 300 moving in the movement direction on the lane in which the vehicle 100 is currently moving is detected, and the obstacle 200 moving in the opposite direction to the movement direction of the vehicle is not detected, thereby preventing the driver from experiencing confusion.

As the second embodiment for determining the turn and backward movement direction of the vehicle, the information collection unit 10 is connected to the steering wheel 13 of the vehicle, and when the determination unit 20 determines that the vehicle enters the special mode when entering the road, the control unit 30 may deactivate the rear monitoring function of the side opposite to the turn direction of the vehicle checked through the information collecting unit 10 connected to the steering wheel 13.

The information collection unit 10 monitors the information of the navigator 11 and the information of the GPS 12 to collect the movement information that the vehicle enters the road by turning and moving backward, and the determination unit 20 may determine whether the vehicle enters the special mode based on this information.

In this case, after the determination unit 20 determines that the vehicle enters the special mode, the control unit 30 may check the turn and backward movement direction based on the turn direction of the steering wheel 13 collected by the information collection unit 10 and may control to deactivate the rear detection function on the side opposite to the turn and backward movement direction based on the turn and backward movement direction.

Through this, only the obstacle moving in the movement direction of the lane in which the vehicle is currently moving is detected, and the obstacle moving in the opposite direction to the movement direction on the lane is not detected, thereby preventing the driver from experiencing confusion.

When the turn and backward movement direction of the vehicle is checked through the turn of the steering wheel 13, there is an effect of more intuitively checking the turn direction.

The system further includes a sensing unit 40 that is provided at the rear of the vehicle to sense the obstacle moving in a direction intersecting with the backward movement direction of the vehicle at the rear of the vehicle and performs the rear monitoring function. The sensing unit 40 may operate when the vehicle moves backward.

The sensing unit 40 may be connected to the detection sensor to sense the obstacle moving in a direction intersecting the movement direction of the vehicle at the rear of the vehicle, and the control unit 30 is connected to the sensing unit 40 to control the operation of the sensing unit 40.

Figure 4:
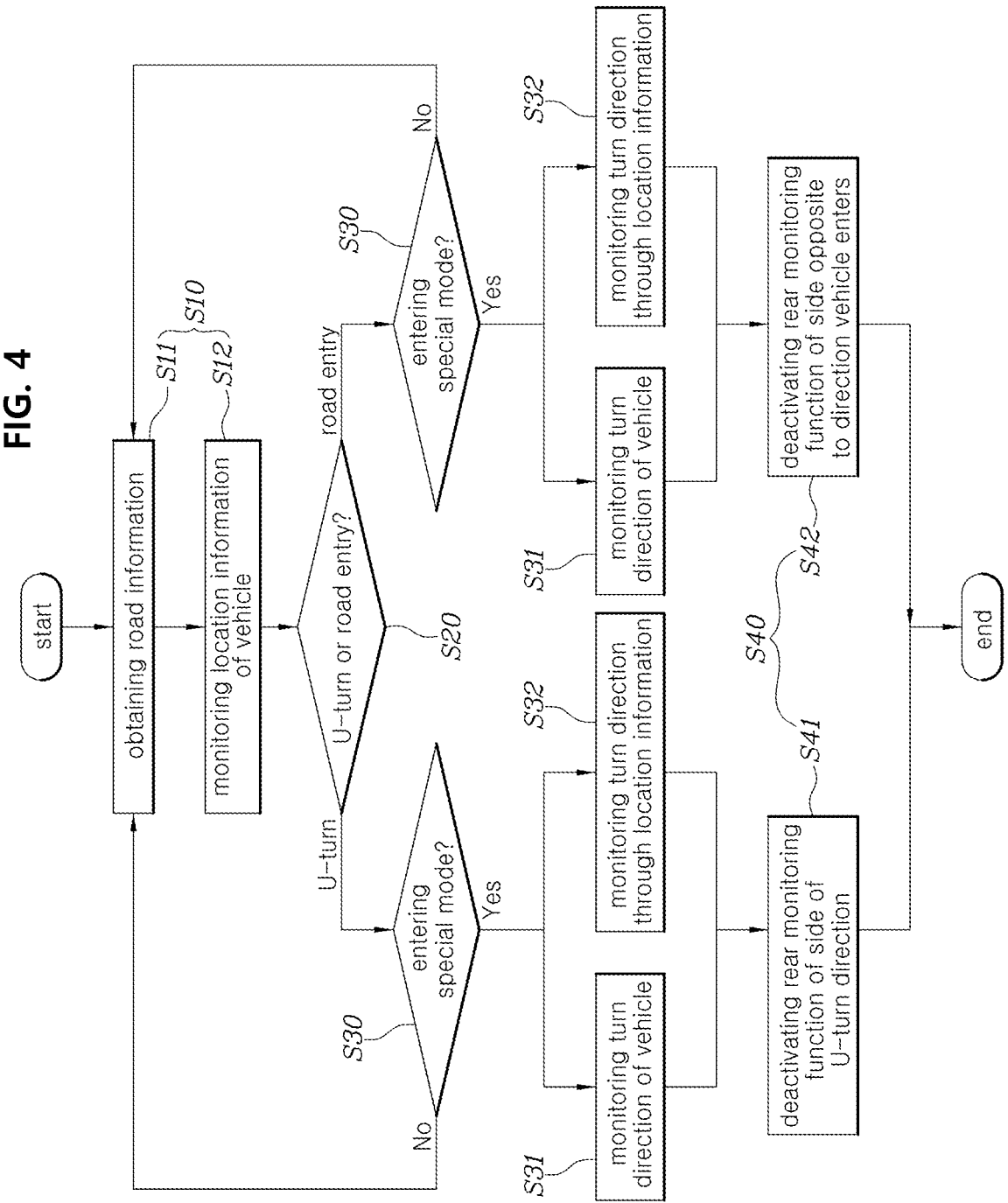
FIG. 4 is a flowchart of a method for detecting an obstacle for a vehicle according to an embodiment of the present disclosure.

FIG. 4 is a flowchart of a method for detecting an obstacle for a vehicle according to an embodiment of the present disclosure.

A preferred embodiment of the method for detecting an obstacle for a vehicle according to the present disclosure will be described with reference to FIG. 4.

A method for detecting an obstacle for a vehicle according to the present disclosure includes the steps of monitoring movement information of the vehicle, road information, and location information of the vehicle; determining whether the vehicle enters a special mode in which the vehicle turns and moves backward on the road through the movement information of the vehicle, the road information, and the location information of the vehicle of the information collection unit 10; and controlling the rear monitoring function of either side to be deactivated in a state in which the special mode is entered.

The monitoring step may include the steps of obtaining the road information through the navigator 11 provided in the vehicle and monitoring the movement information and the location information of the vehicle by being connected to the GPS 12.

In the step of obtaining the road information, the information on the lane in which the vehicle moves is checked through the connected navigator 11, and in the step of monitoring the location information, the U-turn situation of the vehicle is monitored through the GPS 12. In the determining step, whether to enter the special mode during the U-turn of the vehicle may be determined.

If it is determined in the determining step that the special mode is entered during the U-turn of the vehicle, the rear monitoring function on the side opposite to the turn direction of backward movement checked in the step of monitoring the location information may be deactivated in the controlling step.

The monitoring step further includes the step of monitoring the turn direction of the vehicle through the turn direction of the steering wheel 13 of the vehicle. In the determining step, if it is determined that the special mode is entered during the U-turn of the vehicle, the rear monitoring function may be deactivated on the side opposite to the turn direction of the backward movement checked through the step of monitoring the turn direction of the vehicle in the controlling step.

In the step of obtaining the road information, the information on the lane in which the vehicle moves is checked through the connected navigator 11, and in the step of monitoring the location information, whether the vehicle enters the road is monitored through the GPS 12. In the determining step, whether the vehicle enters the special mode when entering the road may be determined.

If it is determined in the determining step that the vehicle enters the special mode when entering the road, the rear monitoring function may be deactivated on the side opposite to the direction the vehicle is entering checked in the step of monitoring the location information in the controlling step.

The monitoring step further includes the step of monitoring the turn direction of the vehicle through the turn direction of the steering wheel 13 of the vehicle. If it is determined in the determining step that the vehicle enters the special mode when entering the road, the control unit 30 may deactivate the rear monitoring function on the side opposite to the direction the vehicle is turning checked through the step of monitoring the turn direction.

The information collection unit 10, the determination unit 20, the control unit 30, and the sensing unit 40 according to an exemplary embodiment of the present disclosure may be implemented through a non-volatile memory (not shown) configured to store data regarding an algorithm configured to control the operations of various components of a vehicle or a software command for reproducing the algorithm, and a processor (not shown) configured to perform operations described below using the data stored in the corresponding memory. Here, the memory and the processor may be implemented as separate chips. Alternatively, the memory and processor may be implemented as a single chip integrated with each other. A processor may take the form of one or more processors.

FIG. 1 is a block diagram of a system for detecting an obstacle for a vehicle according to an embodiment of the present disclosure, FIG. 2 is a view showing a U-turn situation of a vehicle in an embodiment of the present disclosure, FIG. 3 is a view showing a situation in which a vehicle enters a road in an embodiment of the present disclosure.

A dotted line in the detection range of FIGS. 2 to 3 indicates that a warning signal is deactivated, and a solid line indicates that the warning range is activated.

A preferred embodiment of a system for detecting an obstacle for a vehicle according to the present disclosure will be described with reference to FIGS. 1 to 3.

In a conventional vehicle, a detection sensor is provided at the rear of the vehicle to detect an obstacle moving in a direction intersecting with the vehicle when the vehicle moves backward. The detection sensor with a rear detection function is operated when the driver shifts a gear to reverse, so that the obstacle moving from the rear right and left can be detected.

However, the vehicle turns and moves backward when the vehicle enters the road by turning in moving backward, or when the width of the road is insufficient at the U-turn. In this case, the detection sensor generates a warning signal from the rear of the vehicle toward both the movement direction on the road and the vehicle in the opposite movement direction but the warning toward the vehicle in the opposite movement direction is unnecessary.

In the system for detecting an obstacle for a vehicle of the present disclosure, a situation in which the vehicle turns and moves backward on the road as described above is defined as a special mode. The purpose is to prevent the driver from experiencing confusion by terminating a warning signal in the special mode for a vehicle moving in the opposite direction to the road on which the vehicle is located.

A system for detecting an obstacle for a vehicle according to the present disclosure includes an information collection unit 10 that monitors movement information of the vehicle, road information, and location information of the vehicle; a determination unit 20 that determines whether the vehicle enters a special mode in which the vehicle turns and moves backward on the road through the movement information of the vehicle, the road information, and the location information of the vehicle of the information collection unit 10; and a control unit 30 that deactivates a rear monitoring function of either side in a state in which the special mode is entered.

The information collection unit 10 may be connected to the driving device of the vehicle to check a forward movement or backward movement of the vehicle, and may also check a turning movement or straight movement of the vehicle.

The driving device of the vehicle may be an engine, a transmission, or a steering device, and the information collection unit 10 may be connected to an operating device such as a gear lever, an accelerator pedal, or a steering wheel 13 through which the driver operates the driving device.

In addition, the information collection unit 10 may be connected to a navigator 11 or a GPS 12 of the vehicle to collect information on a current location and movement direction of the vehicle to obtain road information and location information.

The determination unit 20 may determine a situation in which the vehicle enters a special mode in which the vehicle turns and moves backward on the road based on the movement information and location information of the vehicle and the road information on which the vehicle currently moves collected by the information collection unit 10.

After that, when the determination unit 20 determines that the special mode has been entered, the control unit 30 controls to terminate the monitoring function for an obstacle on the road moving in the opposite direction to the road on which the vehicle is located among the rear monitoring functions of both sides.

Through this, the control unit 30 controls the rear monitoring function to warn only the obstacle to which the driver should be alert, thereby preventing the driver from experiencing confusion.

As described above, the information collection unit 10 may be connected to the navigator 11 and the GPS 12 provided in the vehicle to monitor the movement information, the road information, and the location information of the vehicle.

The information collection unit 10 is connected to the navigator 11 to collect the movement direction on the road on which the vehicle moves or the movement path of the vehicle to predict the movement direction of the vehicle, and is connected to the GPS 12 to check the current location of the vehicle and the movement direction and the movement speed. The determination unit 20 may check the entry into the special mode of the vehicle based on this.

Hereinafter, as a first embodiment of the present disclosure, the information collection unit 10 checks information on the lane in which the vehicle moves through the connected navigator 11, and monitors the U-turn situation of the vehicle through the GPS 12, The determination unit 20 may determine whether to enter the special mode during the U-turn of the vehicle.

FIG. 2 shows a situation in which after a U-turn, the road width is narrow compared to the length of the vehicle, and the vehicle turns and moves backward to align itself with the lane.

The U-turn situation is checked in the expected path of the vehicle collected by the information collection unit 10 or the current U-turn situation of the vehicle is checked through the GPS 12. The information on the vehicle turning and moving backward after the turning for the U-turn is checked through the GPS 12. The determination unit 20 can determine whether the vehicle enters the special mode through this information.

As the first embodiment for determining the turn and backward movement of the vehicle, when the determination unit 20 determines that the vehicle enters the special mode during the U-turn, the control unit 30 can deactivate the rear monitoring function on the side of the U-turn direction checked through the information collection unit 10 connected to GPS 12.

The information collection unit 10 monitors the information of the navigator 11 and the information of the GPS 12 to collect the movement information in which the vehicle turns and moves backward after the U-turn, and the determination unit 20 determines whether the vehicle enters the special mode based on this.

In this case, the control unit 30 may monitor the U-turn direction of the vehicle collected by the information collection unit 10 as the information of the GPS 12, and detect only the obstacle moving in the movement direction of the lane in which the vehicle is currently moving by terminating the rear detection function of the monitored U-turn direction. Thus, there is an effect of preventing the driver from experiencing confusion by detecting only the obstacle moving in the movement direction on the lane and not detecting the obstacle moving in the opposite direction to the movement direction on the lane.

As a second embodiment of determining the turn and backward movement direction of the vehicle, the information collection unit 10 is connected to the steering wheel 13 of the vehicle, and when the determination unit 20 determines that the vehicle enters the special mode during the U-turn, the control unit 30 may deactivate the rear monitoring function on the side opposite to the turn direction of the backward movement checked through the information collecting unit 10 connected to the steering wheel 13.

The information collection unit 10 collects the movement information in which the vehicle turns and moves backward after the U-turn, and the determination unit 20 may determine whether the vehicle enters the special mode based on this information.

The information collection unit 10 monitors the information of the navigator 11 and the information of the GPS 12 to collect the information on making a U-turn, and collets the movement information in which the vehicle turns and moves backward after the U-turn through the turn information of the steering wheel 13. The determination unit 20 may determine whether the vehicle enters the special mode based on this this information.

In this case, the control unit 30 may monitor the U-turn direction of the vehicle collected by the information collection unit 10 as the information of the GPS 12, and may detect only the obstacle moving in the movement direction on the lane in which the vehicle is currently moving by terminating the rear detection function on the side in which the vehicle turns and moves backward while the steering turns in the opposite direction to the U-turn direction to move backward after making the U-tern. Therefore, it has the effect of preventing the driver from experiencing confusion by controlling so as not to detect the obstacle moving in the direction opposite to the movement direction on the lane.

When the turn and backward movement direction of the vehicle is checked through the turning of the steering wheel 13, there is an effect of more intuitively checking the turn direction.

Next, as the second embodiment of the present disclosure, the information collection unit 10 checks the information on the lane in which the vehicle moves through the connected navigator 11, and monitors the vehicle's road entry situation through the GPS 12, and the determination unit 20 may determine whether the vehicle enters the special mode when the vehicle enters the road.

FIG. 3 shows a situation in which a vehicle enters a road in which a lane and a center line are arranged from a road without the lane such as an alleyway, and the vehicle turns and moves backward to enter the road.

The road entry of the vehicle in the expected path of the vehicle collected by the information collection unit 10 is checked or the situation in which the vehicle is currently entering the road is checked through the GPS 12, and the information that the vehicle enters the road while turning and moving backward is checked through the information of the GPS 12. Through this information, the determination unit 20 can determine whether the vehicle enters the special mode.

As the first embodiment for determining the turn and backward movement direction of the vehicle, when the determination unit 20 determines that the vehicle enters the special mode in entering the road, the control unit 30 may deactivate the rear monitoring function on the side opposite to the direction in which the vehicle is entering, which is checked through the information collection unit 10 connected to the GPS 12.

The information collection unit 10 monitors the information of the navigator 11 and the information of the GPS 12 to collect the movement information that the vehicle enters the road by turning and moving backward, and the determination unit 20 may determine whether the vehicle enters the special mode based on this information.

In this case, after the determination unit 20 determines that the vehicle enters the special mode, the control unit 30 may control to deactivate the rear detection function on the side opposite to the turn and backward movement direction based on the vehicle's turn and backward movement direction through the information of the navigator 11 and the information of the GPS 12 collected by the information collection unit 10.

Through this, only the obstacle moving in the movement direction on the lane in which the vehicle is currently moving is detected, and the obstacle moving in the opposite direction to the movement direction of the vehicle is not detected, thereby preventing the driver from experiencing confusion.

As the second embodiment for determining the turn and backward movement direction of the vehicle, the information collection unit 10 is connected to the steering wheel 13 of the vehicle, and when the determination unit 20 determines that the vehicle enters the special mode when entering the road, the control unit 30 may deactivate the rear monitoring function of the side opposite to the turn direction of the vehicle checked through the information collecting unit 10 connected to the steering wheel 13.

The information collection unit 10 monitors the information of the navigator 11 and the information of the GPS 12 to collect the movement information that the vehicle enters the road by turning and moving backward, and the determination unit 20 may determine whether the vehicle enters the special mode based on this information.

In this case, after the determination unit 20 determines that the vehicle enters the special mode, the control unit 30 may check the turn and backward movement direction based on the turn direction of the steering wheel 13 collected by the information collection unit 10 and may control to deactivate the rear detection function on the side opposite to the turn and backward movement direction based on the turn and backward movement direction.

Through this, only the obstacle moving in the movement direction of the lane in which the vehicle is currently moving is detected, and the obstacle moving in the opposite direction to the movement direction on the lane is not detected, thereby preventing the driver from experiencing confusion.

When the turn and backward movement direction of the vehicle is checked through the turn of the steering wheel 13, there is an effect of more intuitively checking the turn direction.

The system further includes a sensing unit 40 that is provided at the rear of the vehicle to sense the obstacle moving in a direction intersecting with the backward movement direction of the vehicle at the rear of the vehicle and performs the rear monitoring function. The sensing unit 40 may operate when the vehicle moves backward.

The sensing unit 40 may be connected to the detection sensor to sense the obstacle moving in a direction intersecting the movement direction of the vehicle at the rear of the vehicle, and the control unit 30 is connected to the sensing unit 40 to control the operation of the sensing unit 40.

FIG. 4 is a flowchart of a method for detecting an obstacle for a vehicle according to an embodiment of the present disclosure.

A preferred embodiment of the method for detecting an obstacle for a vehicle according to the present disclosure will be described with reference to FIG. 4.

A method for detecting an obstacle for a vehicle according to the present disclosure includes the steps of monitoring movement information of the vehicle, road information, and location information of the vehicle (S10); determining whether the vehicle enters a special mode in which the vehicle turns and moves backward on the road through the movement information of the vehicle, the road information, and the location information of the vehicle of the information collection unit 10 (S30); and controlling the rear monitoring function of either side to be deactivated in a state in which the special mode is entered (S40).

The monitoring step (S10) may include the steps of obtaining the road information through the navigator 11 provided in the vehicle (S11) and monitoring the movement information and the location information of the vehicle by being connected to the GPS 12 (S12).

In the step of obtaining the road information (S11), the information on the lane in which the vehicle moves is checked through the connected navigator 11, and in the step of monitoring the location information (S12), the U-turn situation of the vehicle is monitored through the GPS 12 (S20). In the determining step, whether to enter the special mode during the U-turn of the vehicle may be determined (S30).

If it is determined in the determining step (S30) that the special mode is entered during the U-turn of the vehicle (S30), the rear monitoring function on the side opposite to the turn direction (S31) of backward movement checked in the step of monitoring the location information may be deactivated (S41) in the controlling step (S40).

The monitoring step (S10) further includes the step of monitoring the turn direction of the vehicle through the turn direction of the steering wheel 13 of the vehicle (S31). In the determining step (S30), if it is determined that the special mode is entered during the U-turn of the vehicle, the rear monitoring function may be deactivated on the side opposite to the turn direction of the backward movement (S41) checked through the step of monitoring the turn direction of the vehicle (S31) in the controlling step (S40).

In the step of obtaining the road information (S11), the information on the lane in which the vehicle moves is checked through the connected navigator 11, and in the step of monitoring the location information (S12), whether the vehicle enters the road is monitored through the GPS (S20). In the determining step (S30), whether the vehicle enters the special mode when entering the road may be determined.

If it is determined in the determining step (S30) that the vehicle enters the special mode when entering the road, the rear monitoring function may be deactivated on the side opposite (S31) to the direction the vehicle is entering (S42) checked in the step of monitoring the location information in the controlling step.

The monitoring step further includes the step of monitoring the turn direction of the vehicle through the turn direction of the steering wheel 13 of the vehicle (S32). If it is determined in the determining step (S30) that the vehicle enters the special mode when entering the road, the rear monitoring function on the side opposite to the direction the vehicle is turning (S42) checked through the step of monitoring the turn direction (S32) in the controlling step (S40).

Although shown and described in relation to specific embodiments of the present disclosure, it will be apparent to those of ordinary skill in the art that the present disclosure can be variously improved and changed without departing from the spirit of the present disclosure provided by the following claims.

What is claimed is:

1. A system for detecting an obstacle for a vehicle, comprising:
    an information collection unit configured to monitor movement information of the vehicle, road information, and location information of the vehicle;
    a determination unit configured to determine whether the vehicle enters a special mode in which the vehicle turns and moves backward on a road through the movement information of the vehicle, the road information, and the location information of the vehicle from the information collection unit; and
    a controller configured to deactivate a rear monitoring function of either side of the vehicle in response to a determination that the vehicle enters the special mode when the rear monitoring function in both a driving direction and an opposite driving direction is activated to generate a warning signal to a driver.

2. The system according to claim 1, wherein the information collection unit is connected to a navigator and a GPS provided in the vehicle to monitor the movement information, the road information, and the location information of the vehicle.

3. The system according to claim 2, wherein the information collection unit checks information on a lane in which the vehicle moves through the connected navigator, and monitors a U-turn situation of the vehicle through the GPS, and the determination unit determines whether to enter the special mode during the U-turn of the vehicle.

4. The system according to claim 3, wherein if the determination unit determines that the vehicle enters the special mode during the U-turn, the controller deactivates the rear monitoring function on a side of a direction of the U-turn checked through the information collection unit connected to the GPS.

5. The system according to claim 3, wherein the information collection unit is connected to a steering wheel of the vehicle, and if the determination unit determines that the vehicle enters the special mode during the U-turn, the controller deactivates the rear monitoring function on a side of the vehicle opposite to a turn direction of a backward movement checked through the information collecting unit connected to the steering wheel.

6. The system according to claim 2, wherein the information collection unit checks the information on a lane in which the vehicle moves through the connected navigator, and monitors the vehicle's entry into a road through the GPS, and the determination unit determines whether to enter the special mode when the vehicle enters the road.

7. The system according to claim 6, wherein if the determination unit determines that the special mode is entered when the vehicle enters the road, the controller deactivates the rear monitoring function on a side of the vehicle opposite to a vehicle's entry direction checked through the information collection unit connected to the GPS.

8. The system according to claim 6, wherein the information collection unit is connected to a steering wheel of the vehicle, and if the determination unit determines that the special mode is entered when the vehicle enters the road, the controller deactivates the rear monitoring function on a side of the vehicle opposite to a turn direction of the vehicle checked through the information collection unit connected to the steering wheel.

9. The system according to claim 1, further comprising a sensor that is provided at a rear of the vehicle to sense an obstacle moving in a direction intersecting a backward movement direction of the vehicle from the rear of the vehicle and performs the rear monitoring function,
    wherein the sensor is operated when the vehicle moves backward.

10. A method for detecting an obstacle for a vehicle comprises the steps of:
    monitoring movement information of the vehicle, road information, and location information of the vehicle;
    determining whether the vehicle enters a special mode in which the vehicle turns and moves backward on a road through the movement information of the vehicle, the road information, and the location information of the vehicle from an information collection unit of the vehicle; and
    controlling a rear monitoring function of either side of the vehicle to be deactivated in response to determining that the vehicle enters the special mode.

11. The method according to claim 10, wherein the monitoring movement information includes steps of obtaining the road information through a navigator provided in the vehicle and monitoring the movement information and the location information of the vehicle in connection with a GPS.

12. The method according to claim 11, wherein the obtaining the road information comprises checking information on a lane in which the vehicle moves through the connected navigator,
    the monitoring the location information comprises monitoring a U-turn situation of the vehicle through the GPS, and
    the determining comprises determining whether the vehicle enters the special mode during the U-turn.

13. The method according to claim 12, wherein the controlling comprises deactivating the rear monitoring function on a side of a direction of the U-turn checked in the monitoring the location information, if it is determined that the vehicle enters the special mode during the U-turn.

14. The method according to claim 12, wherein the monitoring further includes monitoring a turn direction of the vehicle through a turn direction of a steering wheel of the vehicle, and
    the controlling comprises deactivating the rear monitoring function on a side opposite to the turn direction of a backward movement checked through the step of monitoring the turn direction of the vehicle, if it is determined that the vehicle enters the special mode during the U-turn.

15. The method according to claim 11, wherein the obtaining the information comprises checking information on a lane in which the vehicle moves through the connected navigator, > the monitoring the location information comprises monitoring a situation in which the vehicle enters a load through the GPS, and
>
> the determining comprises determining whether to enter the special mode when the vehicle enters the road.

16. The method according to claim 15, wherein if it is determined in the determining that the special mode is entered when the vehicle enters the road, the controlling comprises deactivating the rear monitoring function on a side of the vehicle opposite to a vehicle's entry direction checked in the step of monitoring the location information.

17. The method according to claim 15, wherein the monitoring step further includes monitoring a turn direction of the vehicle through a turn direction of a steering wheel of the vehicle, and > if it is determined in the determining that the special mode is entered when the vehicle enters the road, the controlling comprises deactivating the rear monitoring function on a side of the vehicle opposite to the turn direction of the vehicle checked through the step of monitoring the turn direction.

* * * * *